April 19, 1927.

K. F. UNGERER 1,625,511

SHAFT COUPLING

Filed April 22, 1924

Inventor
Karl F. Ungerer,
By
atty.

Patented Apr. 19, 1927.

1,625,511

UNITED STATES PATENT OFFICE.

KARL FRIEDRICH UNGERER, OF PFORSHEIM, GERMANY.

SHAFT COUPLING.

Application filed April 22, 1924, Serial No. 708,286, and in Germany December 21, 1923.

The object of this invention is a flexible clutch for use more particularly in coupling shafts and like members which assume angular positions one to the other and should offer a certain amount of flexibility in all directions. This clutch or coupling will be found to be more particularly applicable to the driving of rollers of bending machines, rolling mills and the like. The particular advantage of the novel clutch resides in that its manufacture is extremely simple, and that while it is capable of ensuring a really sound transmission of power, it also offers the requisite flexibility in all directions. In order to attain this, the ends of the shafts to be coupled by the clutch, are provided with cross notches, preferably so that one of these two notches in each shaft is enlarged to form a substantially circular bore. By preference this bore is produced first of all, and a slot is then milled or tooled from above. Fitted in each of these bores is a flat clutch member provided with a head corresponding to the circular bore, and the two clutch members are then asembled by means of slots centrally arranged therein. In this way a cross shaped connecting or clutch member is produced which is adapted to reliably couple the two shaft ends one with the other, while at the same time admitting all movements thereof both axially and at right angles thereto.

A constructional form of the improved clutch is illustrated by way of example in the accompanying drawings in which.

Figure 1:
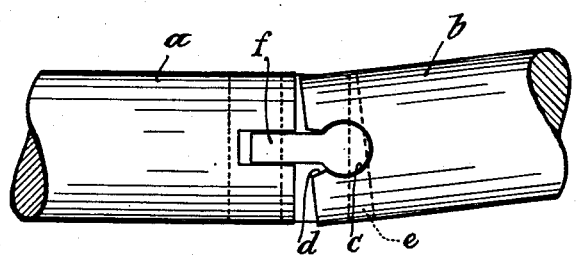
Figure 1 shows the clutch applied to the adjacent ends of two shafts.
Figure 2:
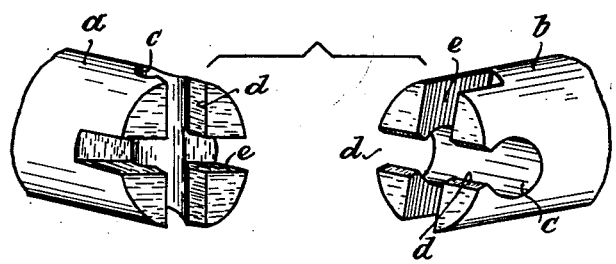
Figure 2 shows in perspective views respectively, the slotting of the adjacent shaft ends.
Figures 3, 5:
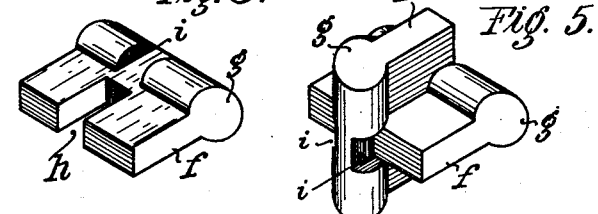
Figure 3 shows one of the clutch members.
Figure 4:
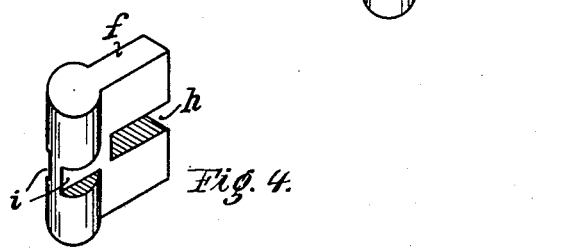

Figure 4 the other clutch member separately in their relative positions and,

Figure 5 shows these clutch members fitted together likewise in perspective views.

The two shafts to be coupled are indicated by $a$ and $b$. In the end to be coupled, each shaft is first of all provided with a circular bore $c$ which is drilled therein at right angles to its axis, whereupon it is enlarged by means of an appropriate milling cutter or other tool so as to present an open slot $d$. A second slot $e$ is then milled in the shaft end at right angles to the first, which second slot need not, however, be circularly enlarged at its base.

Two flat clutch members as shown in Figures 3 and 4, are then formed separately each provided with a circular head $g$ and made of a rectangular cross section $f$ to fit the respective slot and bore. With advantage these clutch members are cut from appropriately rolled or drawn material. Each clutch member is provided with a central slot $h$ by means of which the two members are fitted one over the other as shown in Figure 5. The circular head $g$ is, as shown at $i$ preferably milled away on each side to facilitate said interfitting, which latter, however, does not, of course, take place until after each clutch member has been inserted in the corresponding bores $c$ and slots $d$ and $e$ respectively of its shaft end. After such insertion and connection, it will be found that the two shafts would be reliably coupled and the clutch thus formed enabling the shafts to perform relatively large movements and ensuring sufficient flexibility in every way. The transmisison of power takes places through the clutch members, in which action the cylindrical heads $g$ accommodated in the bores $c$ of the shaft ends transmit the pressure over a relatively large surface. This has the advantage of a reduced wear.

I claim:

1. A shaft coupling comprising shaft ends having the same contour as the shaft with transverse slots and circular seats at the ends of said slots and relatively movable flat plates having cylindrical heads fitting said seats and slots, the shaft ends also having slots at right angles to the afore-mentioned slots and the plates slotted from opposite edges to interfit and form a cross extending into both shaft ends.

2. A shaft coupling comprising shaft ends having transverse slots in each at right angles to one another, and flat interfitting crossed plates seated in said slots.

3. A shaft coupling comprising shaft ends each having transverse slots at right angles to one another, at least one of said slots having a cylindrical enlargement at its end, and flat, interfitting crossed plates seated in said slots, at least one of said plates having a cylindrical head fitting said enlargement.

4. A shaft coupling comprising shaft ends each having transverse slots at right angles to one another, one slot in one shaft end having a cylindrical seat at right angles to a like cylindrical seat in the opposite shaft end, and flat interfitting plates at right angles to one another having cylindrical heads fitting the seats in the respective shaft ends.

5. A shaft coupling comprising shaft ends each having two transverse slots at right angles to one another, one slot being extended into a cylindrical seat extending transversely through its shaft end, and flat interfitting plates at right angles to one another extending into the slots in both shaft ends, and one end of a plate having a cylindrical head fitting said seat.

In testimony that I claim the foregoing as my invention, I have signed my name.

KARL FRIEDRICH UNGERER.